Inventor
ADOLPH RONNING

Sept. 30, 1952 A. RONNING 2,612,387
VEHICLE WHEEL COMPENSATING SUSPENSION
Filed June 22, 1945 7 Sheets-Sheet 2

Inventor
ADOLPH RONNING
By Carlsen & Hagle
Attorneys

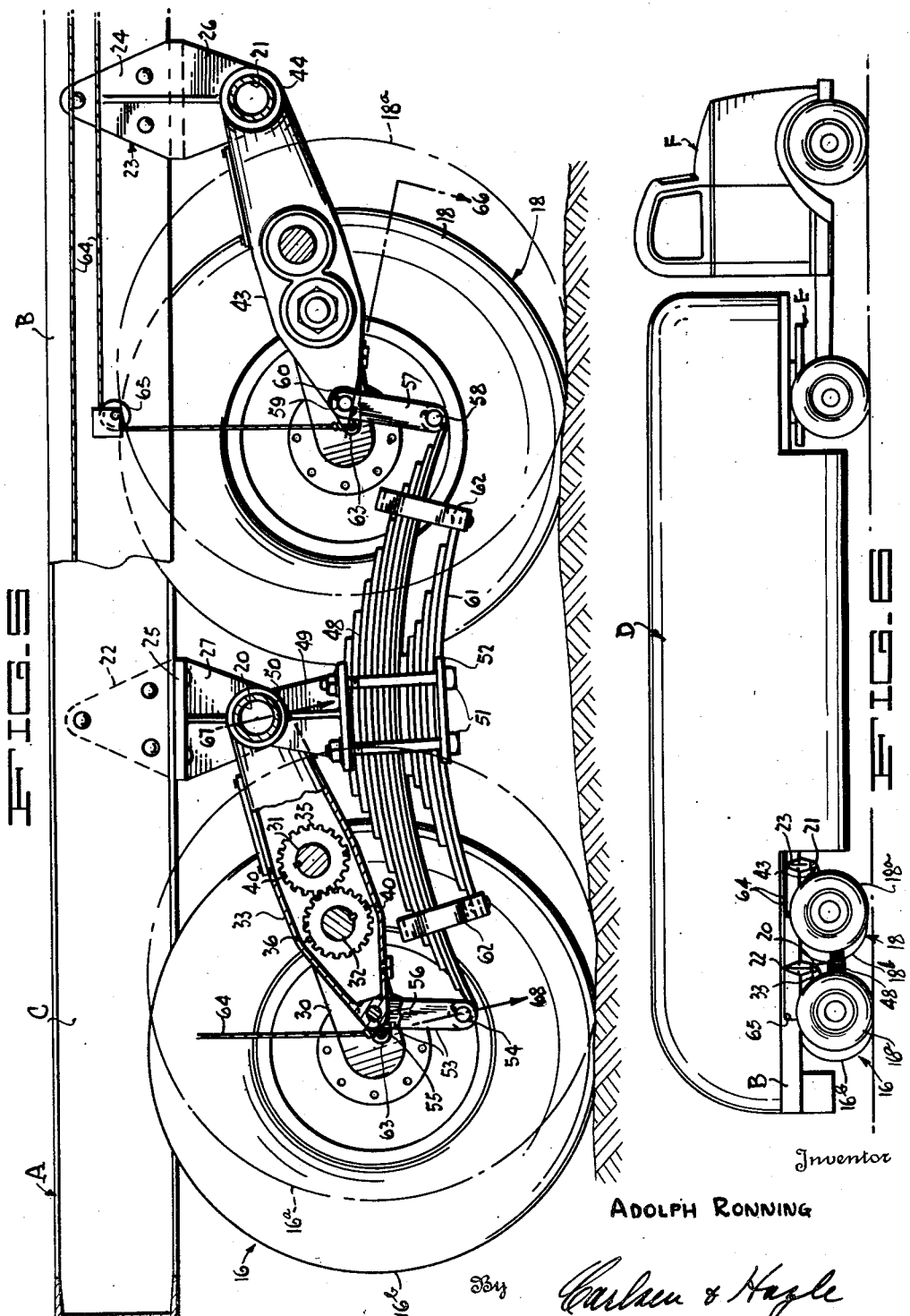

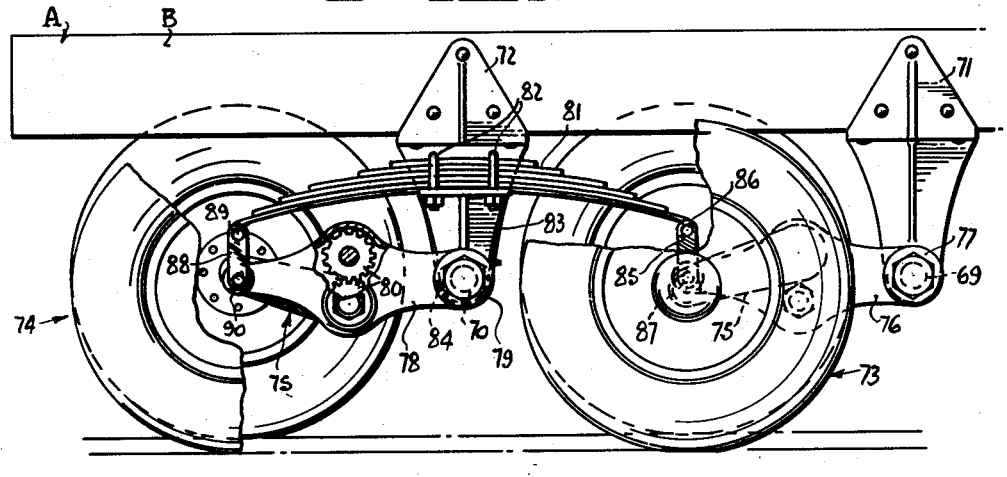
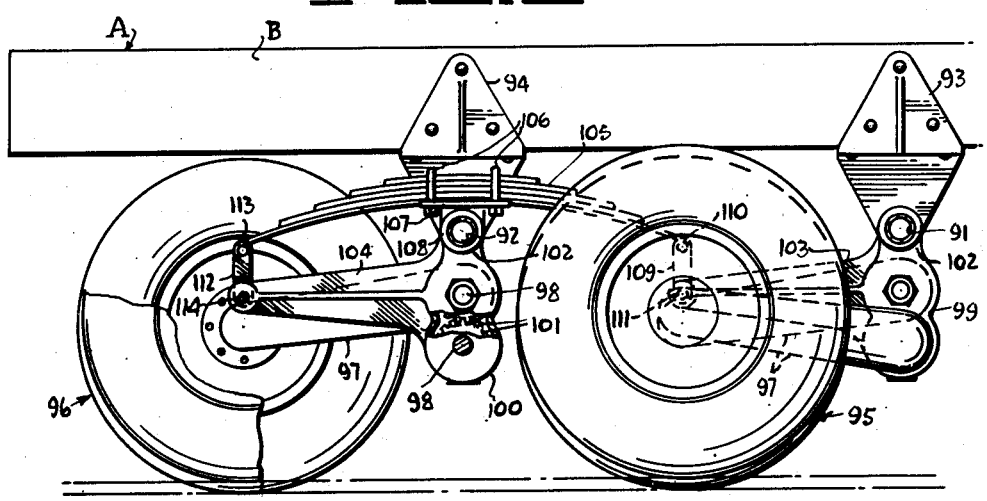

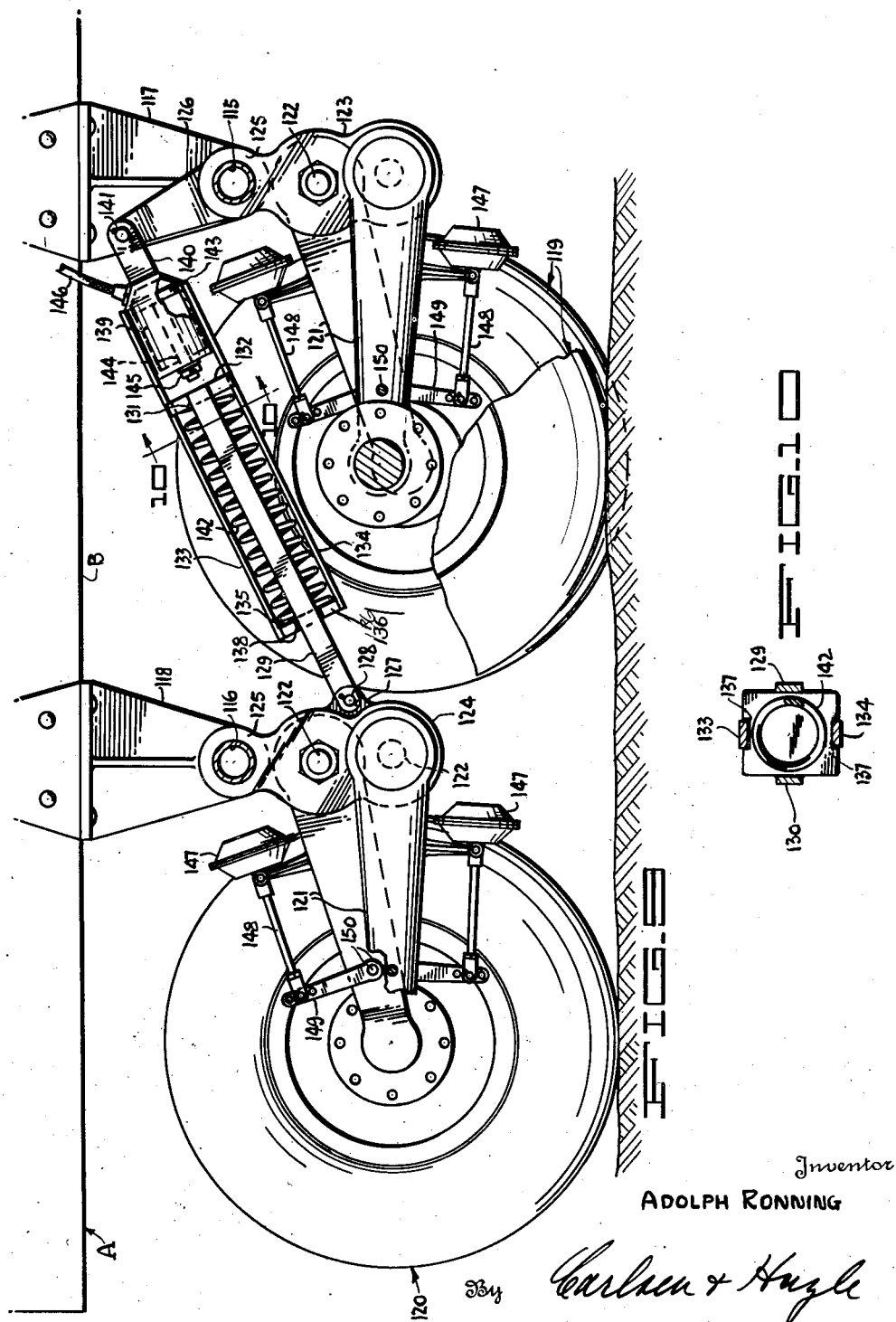

Sept. 30, 1952  A. RONNING  2,612,387
VEHICLE WHEEL COMPENSATING SUSPENSION
Filed June 22, 1945  7 Sheets-Sheet 6
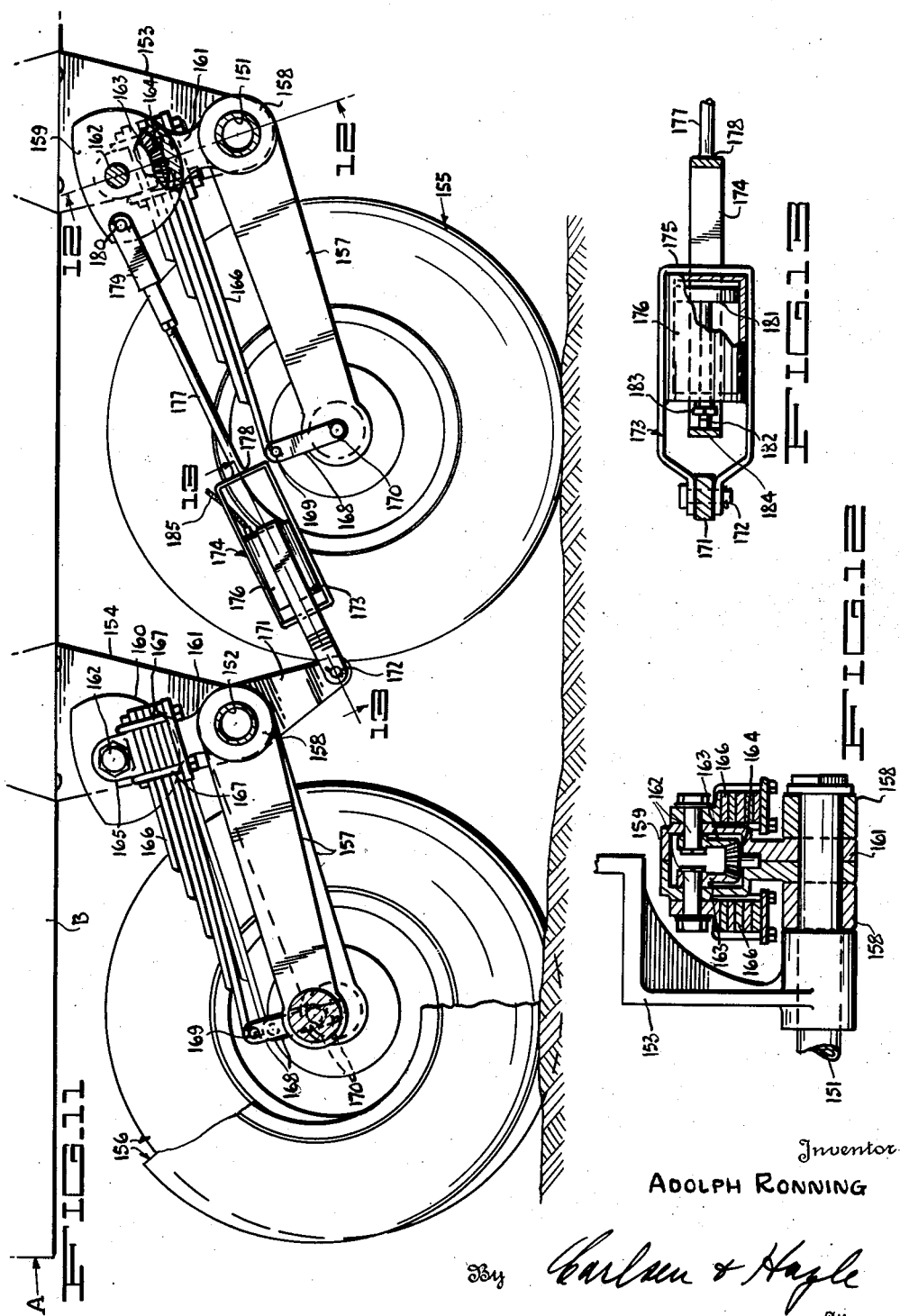
Inventor
ADOLPH RONNING
By Carlsen & Hayle
Attorneys Sept. 30, 1952 A. RONNING 2,612,387
VEHICLE WHEEL COMPENSATING SUSPENSION
Filed June 22, 1945 7 Sheets-Sheet 7
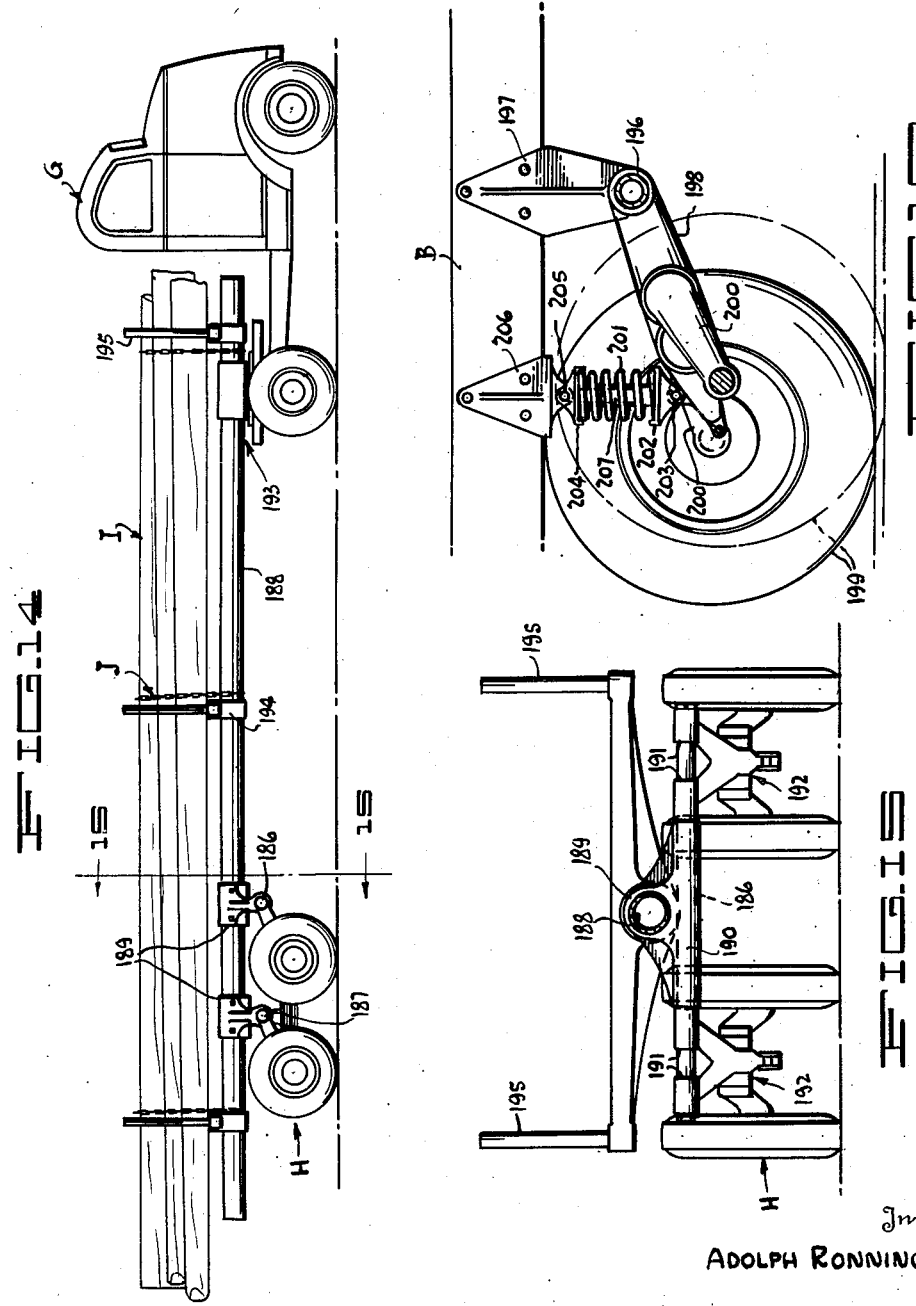
Inventor
ADOLPH RONNING
By Carlsen & Hayle.
Attorney Patented Sept. 30, 1952

2,612,387

UNITED STATES PATENT OFFICE 2,612,387

VEHICLE WHEEL COMPENSATING SUSPENSION

Adolph Ronning, Minneapolis, Minn.

Application June 22, 1945, Serial No. 601,030

36 Claims. (Cl. 280—104.5)

This invention relates generally to improvements in vehicles of the heavy duty and high speed type, and the primary object of the invention is to provide improved wheel suspension and support mechanisms for all vehicles using dual or tandem wheels. Another object is to provide a heavy duty vehicle supporting truck of novel and advantageous construction embodying a plurality of wheels all arranged to evenly distribute the load over a maximum of ground surface and in such manner as to impart the maximum of stability to the vehicle under all conditions. Another object of the invention is to provide a multi-wheeled vehicle supporting truck in which the wheels are arranged for interdependent and relative up and down movements to accommodate themselves to road surface irregularities while maintaining even load distribution to all wheels.

Another and important object of my present invention is to provide a vehicle supporting truck of this character wherein the brake torque load is maintained in balance and the tendency of the rearmost wheels to kick up when the brakes are applied is eliminated. The construction of my improved truck is further such that, as contrasted to the troublesome kick-up encountered in most such truck assemblies of my knowledge, both the front and rear wheels as supported and connected in accordance with my invention actually have a downward movement, or "squatting" tendency, when the brakes are applied, whereby the torque load will be evenly distributed to all wheels and wear on the tires greatly reduced.

Another and also important object of my present invention is to provide a multi-wheeled supporting truck wherein the transversely spaced wheels of each row are staggered or offset in the longitudinal direction. The wheels are thus so positioned that they will not all at once come in contact with transverse expansion joints in the highways, but so that a part of the wheels will first meet the joint before the following wheels do, so that the whole weight supported on the wheels will not come upon the joint at the same time. This has been a troublesome factor in heavy duty highway equipment, and it has been found that where the wheels are all transversely aligned there is a marked tendency for the sudden load placed upon the expansion joint to cause damage to the concrete adjacent thereto.

These and other more detailed and specific objects will be disclosed in the course of the following specification, reference being had to the accompanying drawings, in which—

Fig. 5 is an enlarged side elevation of the truck in Fig. 1 which illustrates the walking beam action of the wheels, and with certain parts shown in section and with the near wheels of the two wheeled pairs illustrated shown only in broken lines, the view being taken along the line 5—5 in Fig. 1.

Fig. 6 is a side elevation on a reduced scale showing my improved supporting truck in use upon a fuel transport truck, and further showing the manner in which a part of the wheels of the truck may be raised to an idle position when the transport is running empty.

Fig. 7 is a view similar to Fig. 3, but illustrating a modified construction of the supporting truck.

Fig. 8 is a similar view but illustrating a further modification.

Fig. 9 is a side elevation partially in section, and with certain parts omitted and illustrating still another modification of my invention.

Fig. 10 is an enlarged detailed cross section along the line 10—10 in Fig. 9.

Fig. 11 is a view similar to Fig. 9 and illustrating still another modification of the invention.

Fig. 12 is a detailed cross sectional view along the line 12—12 in Fig. 11.

Fig. 13 is a similar view taken along the line 13—13 in Fig. 11.

Fig. 14 is a side elevation on a reduced scale similar to Fig. 6, but illustrating the application of my invention to a heavy lumber or timber transport truck.

Fig. 15 is an enlarged cross section along the line 15—15 in Fig. 14.

Fig. 16 is a side elevation of a dual wheel modification of my invention, the near wheel being removed and its axle shown in section.

*Figures 1–6*

Figure 1:
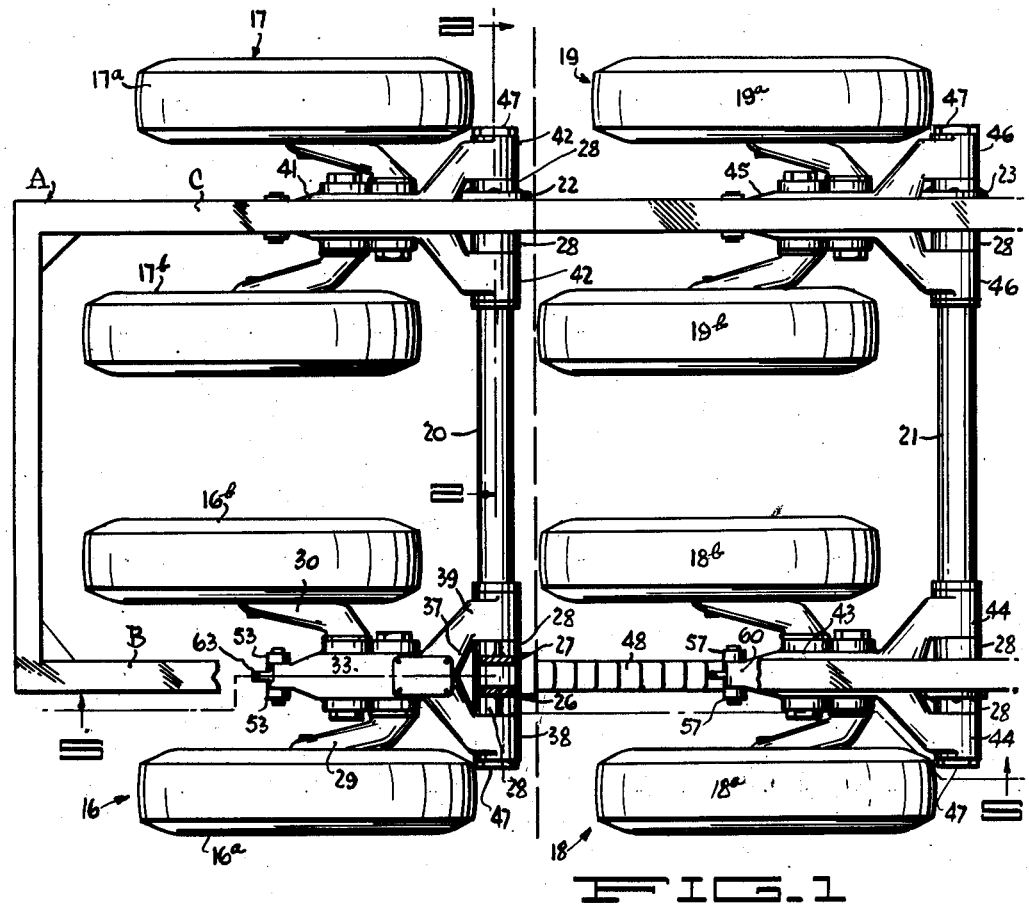
Fig. 1 is a plan view of the rear portion of a heavy duty truck or trailer chassis showing my improved supporting truck connected thereto, and with a portion of one side of the chassis broken away to better illustrate the suspension and connection between the wheels at that side of the truck.

In carrying out my invention as disclosed in this portion of the drawing, I provide an eight-wheeled supporting truck which comprises four essentially identical differential wheel assemblies indicated generally at 16, 17, 18, and 19. Each of such wheel assemblies comprises a pair of wheels and two assemblies are mounted forward of the others so that the eight wheels are arranged longitudinally spaced rows or gangs of four wheels each.

This eight-wheeled truck is arranged at the rear of a vehicle chassis, indicated generally at A, having side beams or channels B and C, and for supportably connecting the truck and chassis I provide forward of the rear row of wheels a transversely extending tubular member or tube 20 and forward of the front row of wheels a similar member or tube 21.

These tubes are connected to the chassis by rear brackets 22 and front brackets 23 respectively, and which brackets have upright portions 24 riveted or otherwise secured to outer vertical surfaces of the channels B and C, and lower base or rest portions 25 similarly secured to the under sides of these channels. From this L-shaped formation each bracket has spaced depending lugs 26 and 27 which carry bearings 28 receiving the adjacent ends of the tubes 20 and 21. Attention is called to the fact that these tubes 20 and 21 constitute the only through cross members, or what may be termed axles, of the entire truck. It is well known, of course, that tubular members of this kind are extremely light and strong, and as will be evident hereinafter, this construction in addition to reducing weight contributes materially to lateral stability and strength of the truck as a whole.

Each dual and differential wheel assembly 16 through 19 is identical with the others and for convenience sake only one will be described in detail herein.

Thus the wheel pair 16 includes transversely spaced individual wheels 16$^a$ and 16$^b$ which are journaled at the rear ends of cranked axles or arms 29 and 30. The forward ends of said axles have parallel oppositely turned trunnion ends 31 and 32 which are journaled, one forward of the other, transversely in and through a differential mechanism including a main, hollow housing member 33 having bearings 34 (Fig. 4) to receive the trunnions. Interiorly of the housing the ends 31 and 32 are provided with gears 35 and 36 which mesh with each other. The forward end of the housing member 33 is forked at 37 and provided with widely spaced and widespread bearings 38 and 39 which are pivotally mounted upon the tubular cross member 20 at opposite sides of the bracket bearings 28 (Fig. 1), and the entire differential assembly is thus arranged for swinging movements with respect to the vehicle, in an upright longitudinal plane.

The gears 35 and 36 act to differentially connect the wheels 16$^a$ and 16$^b$ in such manner that, as either moves upwardly, by swinging movements of its associated cranked axle, the other will move downwardly a corresponding distance. The wheels thus accommodate themselves to inequalities in the road surface over which they travel and maintain equal load distribution at all times.

It may here be noted that this type of differential mechanism, with the wheel axles pivoted on parallel axes, spaced in a fore and aft plane, and with the axles trailing rearwardly from their pivots, is disclosed in my U. S. Patent No. 2,217,817 issued October 15, 1940. In that patent, however, the crank axles were of uneven length to compensate for the spaced pivots and to bring the axes of rotation of the respective wheels into alignment. In the present case the axles 29 and 30 are of equal length and the wheels 16$^a$ and 16$^b$ are accordingly staggered or positioned one forward of the other by a distance equal to the distance at which the trunnion ends 31 and 32 are spaced. The importance of this staggered arrangement will presently appear.

It may further be noted at this point that throughout all modifications of my present invention it is understood I may employ any of the various wheel differential assemblies of my prior U. S. Patents Nos. 2,208,599; 2,208,600; 2,209,093; 2,209,094; and 2,209,095 all issued July 23, 1940; 2,217,816 and 2,217,817 issued October 15, 1940; 2,222,857 issued November 26, 1940; Re. 21,685 and 2,227,762 of January 7, 1941; 2,232,275 issued February 18, 1941; 2,232,972 issued February 25, 1941; 2,244,853 issued June 10, 1941; and 2,254,451 and 2,254,452 issued September 2, 1941 wherever these are suitable and applicable.

The differential movements of the wheels 16$^a$ and 16$^b$ may be limited to a predetermined range by filling in appropriate teeth of the gears 35 and 36 as indicated at 40 in Fig. 5.

As stated above the four wheel assemblies 16, 17, 18 and 19 are identical in construction. Thus the other rear wheel assembly 17 includes differentially connected wheels 17$^a$ and 17$^b$ supporting and connected to a differential mechanism including a housing 41 pivoted by bearings 42 at its forward end upon the opposite end of tubular member 20. The wheel assembly 18, immediately forward of assembly 16 previously described in detail, includes differentially operating wheels 18$^a$—18$^b$ supporting a differential mechanism housing 43 journaled by widespread bearings 44 at its forward end upon the forward tubular member 21. The remaining forward wheel assembly 19 comprises differentially operating wheels 19$^a$—19$^b$ and a housing 45 pivoted by bearings 46 at the opposite end of the tubular member 21. The various wheel assemblies thus arranged are held in place against lateral displacement by the bracket bearings 28 and by plug nuts 47 closing the ends of the tubular cross members 20 and 21.

It will be noted, that by virtue of the previously referred to offsetting of the pivots for the various cranked axles, in a fore and aft plane, that in each front and rear row of wheels two wheels will be positioned slightly forward of the remaining two. Thus the wheels will meet expansion joints on the highway at different times, and distribute the load more evenly at each side of such joints all to the end that the previous tendency to damage the roadbed by this type of heavy duty equipment is alleviated. It will further be observed that all of the differential mechanisms are duplicates and are interchangeable but that as here shown in Fig. 1, they are reversed or "flopped over" in such manner that the outer wheels of each wheel pair are forward of the respective inner wheels of the same pairs.

Figure 2:
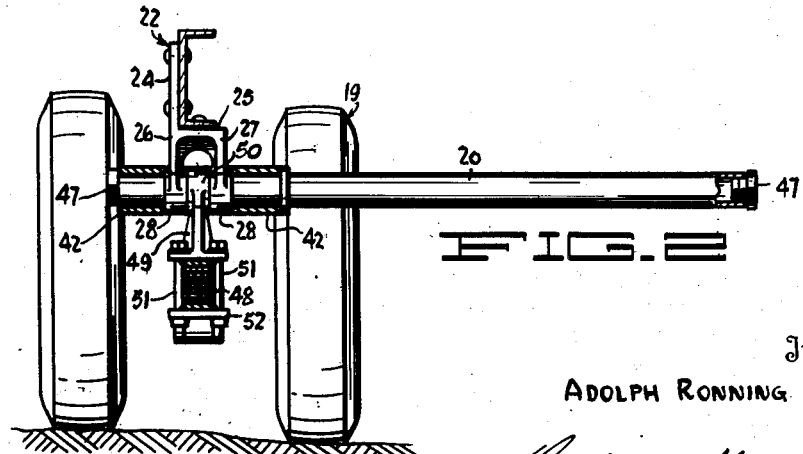
Fig. 2 is a vertical cross section taken substantially along the line 2—2 in Fig. 1.
Figure 3:
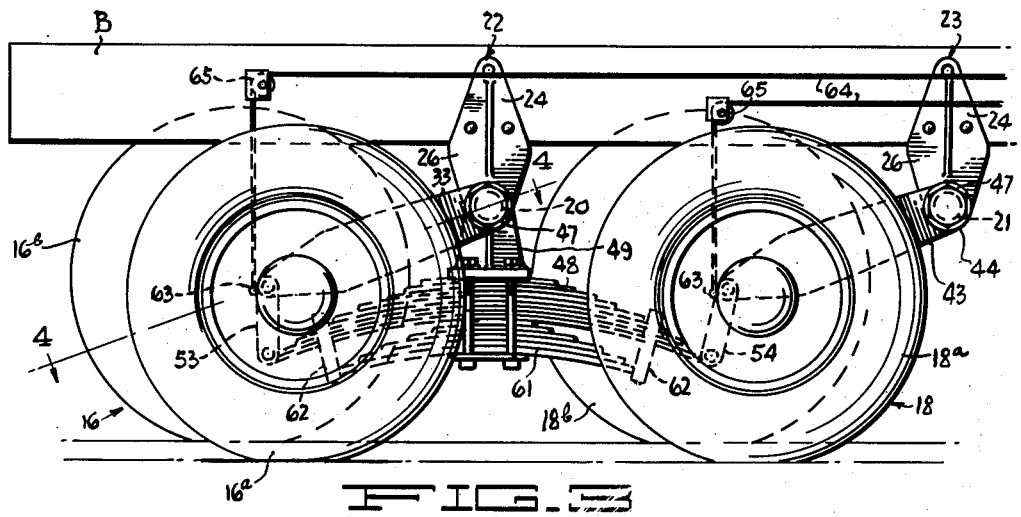
Fig. 3 is a side elevation of the truck as shown in Fig. 1 and illustrating the differential action of the wheels.
Figure 4:
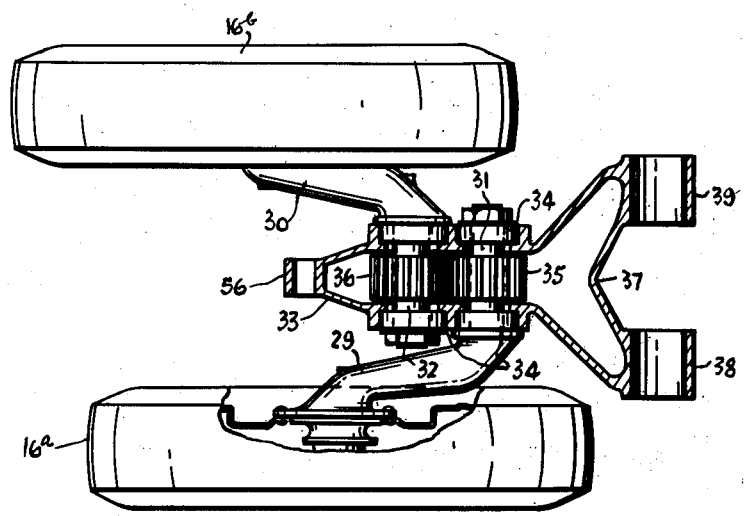
Fig. 4 is an enlarged longitudinal sectional view taken substantially along the line 4—4 in Fig. 3, and particularly illustrating the differential connections between the individual wheels of one of the four pairs making up the supporting truck.

Referring particularly to Fig. 5 it will be seen that an equalizing and spring suspension connection is made between the front and rear pairs of wheels here indicated at 16—18. The same connection is made at the opposite side between wheel pairs 17 and 19. For this purpose I provide a cantilever leaf spring 48 attached at its center to a bracket 49 having a sleeve bearing 50 at its upper end journaled upon the rear tubular member 20 in the space provided between the rear bracket bearings 28 (Fig. 2). Bolts 51 and a lower clamp plate 52 secure the spring 48 to the bracket as clearly indicated, and said bracket 49, of course, forms in effect a supporting connection between the spring and the vehicle. The spring 48 extends in a generally longitudinal direction and may oscillate about the axis of member 20 in upright planes at its ends. The rear end of the spring extends beneath the rear differential mechanism housing 33 and is pivotally connected thereto by shackle links 53 connected by a pin 54 to the spring and by a pin 55 to an eye 56 formed at the rear of the housing. The forward end of the spring extends beneath the rear end of the differential housing 43 of the forward wheel pair 18 and is pivotally connected thereto by shackle links 57 attached by pin 58 to the spring and by a pin 59 to an eye 60 at the rear of said housing. The spring 48 itself is of a heavy duty type but may embody a helper spring 61 loosely connected by shackle loops 62 in a conventional manner, if desired or required.

At the rear of each differential housing 33, 41, 43 and 45 an eye or apertured lug 63 is provided and from each there runs a cable 64 upward over a pulley 65 on the adjacent side of the chains A and then forward to an operating device (not shown) by which said cables may be pulled upwardly and forwardly when desired.

In Fig. 6 I show the truck thus constructed as arranged at the rear of a fuel transport truck D which is attached by the usual fifth wheel mechanism E to a tractor F of usual form.

In operation, not only will the individual wheels of the various wheel pairs have a compensating, differential up and down motion as they accommodate themselves to transverse irregularities in the road surface over which they travel, but the front and rear aligned wheel pairs or assemblies will also have an equalizing action for longitudinal road surface irregularities, due to the walking beam or equalizing action of the springs 48 connecting front and rear aligned wheel pairs. In other words, a downward movement, of say the front wheels 18 of Fig. 5, will cause a downward swinging movement of the forward end of the spring 48 about its pivot upon the rear tubular member 20 and a corresponding upward movement of the rear end of the spring which will be translated to an equalizing upward movement of the rear wheels 16. Such equalizing action is, of course, in addition to the spring suspension of the wheels afforded by the springs 48—61 for absorbing road shocks.

It may here be noted that the springs 48 need not necessarily, as here shown, be pivoted or fulcrumed to the vehicle coaxially with the rear differential housings 33—41, or upon the rear tubular cross members 20, to operate as described above. For example, the spring carrier brackets 49 might be pivoted by separate pins (not shown as this variation is obvious) to the rear brackets 22 or even to separate supports fastened to the vehicle, and the springs will then still oscillate to serve their walking beam and equalizing purposes. I do not, therefore, limit myself to the coaxial pivot arrangement as herein shown throughout the drawing.

Attention is called at this point to the importance of the distance between the front and rear tubular members 20 and 21, with reference to the lengths of the differential housings 33 etc., and of the springs 48. To best advantage the proportional relation of these dimensions is so chosen that, as seen in Fig. 5, the forward shackle links 57 incline upwardly and forwardly in what may be termed the normal positions of the parts, or while the vehicle is operating over comparatively level surfaces. Such position of the links 57 is important in that it provides a maximum of flexibility and smoothness in the up and down movement of the forward wheels. For example, should the front wheels 18 (Fig. 5) drop into a hole in the road surface, the downward movement of the rear end of the housing 43 would further angle the links 57 forwardly until a condition might come to pass in which the points 21, 59 and 58 would reach an alignment or straight line. As the front wheels 18 then crawled up out of such hole the toggle relation of the links 57 and housing 43 would fold upwardly at point 59 with greatest ease and with a minimum of spring reaction to overcome. On the other hand, and as will be clearly apparent, if the proportions were such that the links 57 normally inclined upwardly and rearwardly, or even straight upwardly, a locking effect might be produced under the conditions set forth such as to offer considerable resistance to the operation.

By pulling upon the forward cables 64 it is possible, as seen in Fig. 6, to raise the front wheels out of engagement with the road surface while leaving the rear wheels as sole supports at the rear end of the vehicle. The reverse is, of course, possible and the rear wheels might be raised instead. The utility of this feature of my invention lies in the fact that it enables a truck or transport running empty to operate on fewer wheels to save tires, or in case of damage to either front or rear tires, allows the truck to proceed without damage to nearest point for repair.

It is also possible by adjusting the cables 64 to not only select the working level of the wheels or mean operating angles of the various differential mechanisms, but by selective adjustment of the cables at each side, to adjust the cant or transverse level of the vehicle. In fact, and by for instance pulling on the cables on the inward side of the vehicle as it travels a curve, while paying out the cables on the other side, or even holding them against paying out, it is possible to "bank" the vehicle or so tilt it inwardly as to largely counteract the normal outward rolling tendency and permit of higher speed operation.

It will be noted that not only are the wheels all evenly spaced across the width of the vehicle but that the widest possible bearing is secured upon the relatively wide or long tubular cross members 20 and 21 with widespread bearings between the various differential assemblies and these tubes. All of these factors contribute greatly to lateral stability. Further advantage is secured by the low level location of the heavy parts of the truck, such as the springs 48 and differentials, which weight distribution lowers the center of gravity to further increase stability and make high speed operation possible. It is for this reason that I illustrate this modification of my invention in Fig. 6 as applied to a low slung fuel transport, which equipment operates at high speed on the highways and which heretofore has given much trouble due to high center of gravity and lateral instability.

Although not here shown in detail, since they may be wholly conventional, the various wheels of my truck are all equipped with brakes. When these brakes are applied an advantageous action takes place which overcomes faults in many previous tandem wheel trucks. Without some means to counteract it, there is a well known and marked tendency of a tandem wheel group to kick up at the rear as the brakes are applied, due to a tendency of the entire assembly to rotate about the braked wheels. As a result, the greatest load is thrown on the forward wheels which then assume nearly if not all of the braking action as the rear wheels kick up and lose contact with the road surface. The tremendous load and strain on the front tires may well be imagined.

Consider now the action as the front and rear wheels of Fig. 5 are braked. Since the front wheels 18 have, of course a tendency to continue rotation there is set up a force acting about the centers of these wheels as indicated by the arrow 66. This force is obviously downward if the truck is traveling to the right as viewed in the drawing. There is thus a tendency of the front wheel assembly to "squat" or settle downward and this force is transmitted directly to the spring 48 and through that to the pivot for the rear differential housing 33, causing a downward pull thereon as indicated by arrow 67. This down movement is carried back through housing 33 and through spring 47 and it results in a downward force upon the rear wheels 16, as indicated by arrow 68, which counteracts and overcomes the tendency of the rear wheels to kick up. There results in sum, then, a marked tendency for the entire truck to settle as the brakes are applied, holding all of the wheels in road engagement, and greatly increasing braking effect while reducing tire wear.

Throughout the modifications of my invention now to be described only the wheel pairs or dual wheel assemblies on the near side of the vehicle are shown and described but it will be understood that the same assemblies are provided on the opposite sides of the vehicle. Corresponding frame parts of the vehicle are indicated throughout by the same reference characters heretofore applied.

Figure 7

In this modification I illustrate front and rear tubular cross members 69 and 70 as supported from the frame side B by brackets 71 and 72 similar to those previously described. Arranged to the rear of the forward cross member 69 is a pair of wheels, indicated generally at 73, and similarly arranged behind the rear cross member 70 is another pair of wheels 74. These wheels 73 and 74 are journaled at the rear ends of cranked axles, indicated throughout at 75, and the axles supported by the forward wheel pair 73 are pivoted at forward ends in a differential mechanism housing 76 which is pivotally mounted at its forward end 77 upon the forward cross member 69 for up and down swinging movements in a longitudinal plane with respect to the vehicle. In similar fashion the axles 75 supporting the rear wheel pair 74 are pivoted in a differential mechanism housing 78 pivotally connected at its forward end to the rear cross member 70 for corresponding swinging movements.

The forward trunnion or pivot ends of the cranked axles 75 are pivoted in the respective housings 76 and 78 in vertically spaced or superimposed relation and interiorly of the housings the axles are connected by meshing gears 80 so that the axles will have differential up and down movements at opposite sides of the building. Thus as either axle of the wheel pairs 73 or 74 moves upwardly the other axle of the same pair will have a corresponding downward movement. This type of differential mechanism is essentially the same as that disclosed in more detail in my prior Patents, 2,217,816 and 2,244,853 previously identified.

I also provide in this modification of my invention an equalizing member or walking beam in the form of a cantilever leaf spring 81 which is secured adjacent its center by staple bolts 82 to a spring bracket 83. This spring bracket is pivotally mounted, as indicated at 84, upon the rear cross member 70 so that the spring may oscillate its opposite front and rear ends in the upright longitudinal plane. The forward end of the spring 81 extends over the rearwardly trailing end of the forward differential housing 76 and is connected thereto by shackle links 85 pinned at 86 to the spring and at 87 to said housing. The rear end of spring 81 extends over the rearwardly trailing end of the rear housing 78 and is similarly connected thereto by shackle links 88 pinned at 89 to the spring and at 90 to the rear end of said housing. It will be noted that the spring 81 is supported above the differential housing with the shackle links 85 and 88 in depending positions, and that thus there is greater clearance provided below the housings than is present in the construction of Figures 1 through 6. This may be of advantage in such type of equipment as lumbering trucks or military vehicles or in any equipment operating over ground having stumps or similar obstructions.

It will be course be obvious that the operation of this modification in Figure 7 is essentially identical with that previously described and it is thought that no detailed description should be required.

Figure 8

In the modification of my invention here illustrated I show front and rear tubular cross members 91 and 92 supported by brackets 93 and 94 from the frame side B and with front and rear wheel pairs 95 and 96 arranged respectively to the rear of said cross members. The individual wheels of these wheel pairs 95 and 96 are journaled in the rear ends of cranked axles 97 and the forward parts of these axles are provided with pivot or trunnion ends 98 journaled transversely and in parallel, superimposed positions through front and rear differential housings 99 and 100. Interiorly of said housings 99 and 100 the trunnion ends 98 of the axles are connected by gears 101 to impart a differential action to the axles in exactly the same manner as previously described with reference to Fig. 7.

In this case, however, the differential housings 99 and 100 are positioned below the cross members 91 and 92 and are provided with upwardly extending bearing portions 102 which are pivotally mounted upon said cross members. The housings 99 and 100 are then provided with rigid rearward extensions or arms 103 and 104 respectively postioned between the front and rear pairs of transversely spaced axles 97 and extending approximately back to the centers or axes of the wheels 95 and 96. The pivotal suspension of the housings 99 and 100 is obviously such that they may oscillate in an upright longitudinal plane with respect to the vehicle and in so doing the rear ends of the arms 103 and 104 will move upwardly and downwardly. A cantilever leaf spring 105 is secured at its center by staple bolts 106 to a spring bracket 107 which is journaled at 108 upon the rear cross member 92 in a manner similar to that shown in the previous modification. The spring 105 extends in a lengthwise direction above the differential housing for opposite up and down movements at its respective front and rear ends and the spring is connected by shackle links 109 at its forward end to the rear extremity of the forward arm 103.

Said shackle links are pinned at 110 to the spring and at 111 to said arm 103. The rear end of the spring 105 is similarly connected by shackle links 112 to the rear extremity of the arm 104 over which the rear portion of the spring extends. These shackle links 112 are of course pinned at 113 to the spring and at 114 to the arm 104.

Here again it is believed that the operation of this modification, being identical in all essential respects to that of previous modifications, it will be readily understandable without detailed description.

*Figures 9 and 10*

In this portion of the drawing I illustrate a further modification of my invention which differs from those previously described most particularly in the form of spring suspension and equalizing action which is employed. The same type of front and rear tubular cross members 115 and 116 are supported from the frame side B by brackets 117 and 118 and front and rear wheel pairs 119 and 120 are arranged to the rear of these front and rear cross members, respectively. The individual wheels of each wheel pair 119 and 120 are journaled at the rear of cranked axles, indicated throughout at 121, and the forward trunnion ends 122 of these axles are journaled in parallel superimposed relation in front and rear differential housings 123 and 124, essentially identical to those indicated at 99 and 100 in Fig. 8. These housings 123 and 124 have bearing portions 125 at upper ends by means of which they are pivotally suspended upon the respective front and rear cross members 115 and 116 so that the housings may oscillate in upright longitudinal planes with respect to the vehicle. Interiorly of the housings 123 and 124 the trunnion ends of the axles 121 are differentially connected by gears (not here shown) but in exactly the same manner as illustrated in Figure 8, and so that upward movements of either wheel pair 119 or 120 will be translated into an equal downward movement of the other wheel of the same pair.

In lieu of the cantilever leaf spring acting as a walking or equalizing beam, as previously described, I employ in this modification of my invention a connecting linkage arranged directly between the front and rear housings 123 and 124. For this purpose the front housing 123 is provided with an upwardly and slightly rearwardly extending arm 126, while an apertured lug 127 is provided on the forward side of the rear housing 124. It will at once be obvious that if a rigid link were extended between the upper end of the arm 126 and the lug 127, the swinging movements of the forward housing 123 accompanying up and down movements of the front wheels 119, would be translated to opposite movements of the rear housing 124 to oppositely adjust the rear wheel pair 120. Thus an equalizing action would be obtained between the front and rear wheel pairs.

In accordance with my invention I provide a link mechanism for this purpose but one employing not only spring means for absorbing road shocks but length adjustment for raising and lowering the wheels, as will now be described. Pivotally connected by a pin 128 to the lug 127 on the rear housing 124 is a pair of spaced bars 129—130 which at their forward ends are rigidly secured at 131 to an end plate 132. Assembled in interlocking relation to the bars 129—130 is another pair of similar bars 133—134, which at their rear ends are rigidly secured at 135 to another plate 136. The end plate 132 is notched at 137 at points spaced at 90° to the bars 129—130 for the slidable reception of the bars 133—134; while in similar fashion the plate 136 is notched at 138 at 90° with respect to the bars 133—134 to slidably pass the bars 129—130. The arrangement is thus such that the two end sections of the link comprising the bars 129—130 and 133—134 may have relative endwise movement while being maintained in lengthwise alignment.

The forward ends of the bars 133—134 are rigidly secured by welding or other suitable means along diametrically opposite lines to a hydraulic cylinder 139, and to the end of this cylinder there is affixed a clevis 140 which is pivotally attached by a pin 141 to the upper end of the arm 126 extending from the forward differential housing 123. A heavy expansion coil spring 142 is arranged between the end plates 132 and 136 and is retained in place by the cage-like structure made up by the bars 129—130 and 133—134.

In operation, it will be apparent that an equalizing action will now be obtained such that, as either the front or rear wheel pairs move upwardly in response to irregularities in the road surface, the other wheel pair will be moved downward by the link connection between the respective differential housings 123 and 124. In addition, the spring 142 is so arranged as to permit limited and yieldable expansion and contraction of the linkage connecting the front and rear pairs in such manner as to cushion the wheels against road shocks.

The hydraulic cylinder 139 includes a piston 143 from which there extends rearwardly a piston rod 144 projecting at its rear end through a packing gland 145 into proximity to the front end plate 132. Normally, the piston 143 will stand at a forward position within the cylinder 149, as here shown, and the rear end of the piston rod 144 will clear said end plate 132 to permit free movement of the spring 142 during its shock absorbing action. However, fluid or air under pressure may be admitted to the cylinder head of the piston 143, as through a flexible line 146, and when this is done the piston will be moved rearward until the rear extremity of the piston rod 144 engages the end plate 132. This action may be continued to such point that the spring 142 will then be compressed and the affective length of the link between front and rear differential housings will be increased to any selected amount within the range provided by the piston movement. It will be obvious that such extension of the linkage will result in raising the wheels 119—120 with respect to the vehicle to adjust the mean working angles of the parts wherever this may be required. Not only may the working level of the vehicle thus be selected, within limits, but by selectively operating the cylinders 139 at opposite sides of the vehicle or at one side only, the transverse level or cant may be adjusted. It is of course possible that under automatic control the transverse level of the vehicle may be adjusted when traveling a curve to counteract the rolling over tendency to a large extent and so permit higher speed operation under these conditions.

In this modification of my invention I also illustrate vacuum brake operating mechanisms for the respective wheels. Each said mechanism comprising the conventional operating unit 147, the plunger rod 148 and lever 149, is arranged upon the axle 121 of the associated wheel and the brake actuating shaft for that wheel 150 is journaled in the corresponding axle 121. Thus the entire brake mechanism for each wheel swings as a body with the wheel maintaining proper relation with the brake mechanism thereof without employing any compensating linkage.

Figures 11, 12 and 13

In this modification of my invention I again employ front and rear tubular cross members 151 and 152 supported from the frame side B by brackets 153 and 154, and to the rear of these cross members I arrange front and rear wheel pairs 155 and 156, respectively. The individual wheels of the wheel pairs 155, 156 are journaled at the rear ends of cranked axles, indicated throughout at 157, but differing from previous modifications, the forward ends of these axles are journaled by bearings 158 directly upon the respective cross members 151 and 152.

I then employ differential connecting mechanism for the axles 157, identical in all essential respects to that shown in detail in my patent No. 2,236,734, previously referred to. As here shown, such differential mechanism includes housings 159 and 160 having depending bearings 161 by which they are pivotally supported upon the respective front and rear cross members 151 and 152 for oscillating movements in upright longitudinal planes, independent of the cranked axles. Journaled near the upper ends of the housings 159 and 160 at opposite sides thereof are coaxial shafts 162 each of which, interiorly of the housing, is provided with a gear sector 163. These gear sectors mesh with a pinion 164 so that rotation of either shaft 162 will be translated to an equal or opposite rotation of the other. Rigidly secured to the shafts 162, outside of the housings, are spring brackets 165 to which the forward ends of semi-cantilever leaf springs 166 are rigidly secured by staple bolts 167. There is thus provided a spring 166 extending rearwardly over each cranked axle 167 and the rear extremities of the springs are connected by shackle links 168 to the axles immediately beneath. These shackle links 168 are pinned at 169 to rear ends of the springs and are pivotally attached at 170 to the axles 157 adjacent the rear ends thereof.

The arrangement is thus obviously such that the upward movement of either axle 157 of either pair will so oscillate the associated spring 166 as to operate the sector gears 163 and pinion 164 to differentially translate such movement to the opposed spring 166 and cranked axle of the opposite wheel of the same pair. Thus the individual wheels have a differential action through the springs 166 and in addition those springs act to cushion the wheels individually against road shocks.

In a fashion similar to that disclosed in Figure 9, I here connect the front and rear differential housings 159 and 160 by an equalizing linkage, but which in this case, embodies no spring since the cushioning and shock absorption effect is obtained in the differential mechanisms themselves. As here shown, the rear differential housing 160 is provided with a depending arm 171 to which is pivotally attached by a pin 172 a yoke 173 which is interlockingly engaged with a rectangular yoke 174. The bight or cross portion of the yoke 173 is rigidly secured by welding or other suitable means to the forward end of a hydraulic cylinder 176 which is retained within the cage-like construction afforded by the interlocked yokes. A link rod 177 is rigidly secured at 178 to the forward end of the yoke 174 and at its forward end is provided with a clevis 179 which is pivotally attached by a pin 180 to an upper rear corner of the forward differential housing 159.

A piston 181 is provided within the cylinder 176 and has a piston rod 182 extending out rearwardly through a packing gland 183 into contact with the rear bight of cross member 174. Provision is made by a flexible line 185 for admitting fluid under pressure to the cylinder 176 forwardly of the piston 181.

Normally the linkage thus described will so connect the differential housings 159 and 160 as to provide an equalizing action between the front and rear wheel pairs 155 and 156, exactly as has been previously described. In other words, upward movement of the forward wheel pair, for example, as it encounters a rise in the road surface over which it travels will be translated to an equalizing downward movement of the rear wheel pair and vice versa. By admitting fluid or air under pressure to the cylinder 176 to project the piston 181 and piston rod 182 in a rearward direction, the effective length of the linkage connecting the differential housing may be decreased at will to so vertically adjust the positions of the wheels 155 and 156 with respect to the vehicle. Here again selective adjustment of the linkage on the opposite side of the vehicle may be employed for canting the vehicle as it travels around curves or for otherwise adjusting the transverse level as will be required.

Figures 14 and 15

I here illustrate the principles of my invention as previously described applied to a heavy duty timber or lumber truck comprising the usual tractor G to which an eight-wheeled truck, indicated generally at H, made up in accordance with any modification of my invention is applied as a rear support. Of special importance here is the ease in which the tubular cross members, indicated at 186 and 187, adapt themselves to connection to a longitudinally extending tubular reach member 188 for forming the main backbone of the truck. The reach tube 188 may be rigidly secured by sleeved castings 189 to the cross tubes 186—187 very conveniently, and such castings 189 may, as seen in Fig. 15, have tubular tubular portions 190 extending the full width of the cross tubes between the bearings 191 of the differential mechanism, indicated generally at 192. At the forward end of the reach tube 188 will, of course, be attached by a wheel mechanism 193 of any convenient form to the rear end of the tractor G.

Suitable bolster castings 194 provided with end stakes 195 may be secured in spaced relation along the length of the reach tube 188 to provide cradles for the reception of the timbers, indicated at I, held in place by chains J. Obviously the foregoing construction is such that only a skeletonized frame work is required for a truck or transport of this character, but at the same time the maximum of lateral stability is secured consonant with the heavy loads ordinarily carried by this type of equipment.

Figure 16

I here illustrate a dual wheel modification of my invention as contrasted to the tandem wheel arrangements previously described, and with individual spring suspension for the differential housing.

A tubular cross member 196 is supported from the frame side B by a bracket 197 and for example I have shown a differential housing 198 of exactly the same type as that illustrated at 33 in Figure 5 as connected to this cross member. Dual transversely spaced wheels 199 are journaled at the rear ends of the cranked axles 200 which are differentially connected inside the housing 198 to provide opposite compensating up and down movements for the wheels.

In lieu of the various equalizing mechanisms previously described, the wheels 199 are cushioned against road shocks by an expansion coil spring 201 braced at its lower end against a spring seat 202 pivoted at 203 to a rear portion of the housing 198. The upper end of the spring 201 is similarly braced against a cap member 204 pivoted at 205 to a bracket 206 secured to the frame side B. The spring seat 202 and cap 204 are held in alignment by telescoping tubular members 207 in a well known manner. Obviously this construction is such that the wheels 199 in addition to their differential compensating movements may move upwardly and downwardly as a body while yieldably cushioned against road shocks by the spring 201.

It will be noted that a dual wheel assembly of exactly the same characteristics may also be provided in the structures for example of Figures 7 and 8, by merely eliminating the forward wheel assemblies and substituting semi-cantilever springs for the remaining wheels while securing said springs at forward ends to the vehicle.

The cable arrangements for raising and lowering the wheels as illustrated in Figures 1-6 may of course be carried through to other embodiments of the invention, although they are not here shown for convenience.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a tandem wheel supporting truck for a vehicle frame, a pair of transversely extending parallel tubular cross members secured to the frame, a separate row of transversely spaced ground wheel pairs positioned rearwardly of each cross member, means differentially connecting the wheels of each pair, and means supportably connected to the wheel pairs and swingable on the cross members for transmitting load forces to the wheels while permitting limited up and down movements thereof with respect to the vehicle.

2. A vehicle supporting truck, comprising in combination, a pair of differential wheel connecting mechanisms arranged one behind the other and each swingably connected to the vehicle for swinging movements in upright planes with respect thereto, separate wheel pairs supported by each of said mechanisms and the wheels of each pair being connected for movements in opposite up and down directions by said differential mechanisms, a longitudinally rigid connection between said mechanisms movable endwise by movements of said mechanisms and so connected thereto as to translate up movements of one to down movements of the other, and said differential mechanisms including spring means pivoted on an axis coaxial with the axis about which the rear mechanism swings and yieldably urging the respective wheels downwardly and operative to absorb road shocks.

3. In a vehicle supporting truck, the combination comprising a pair of members arranged in tandem relationship and each pivotally connected at its forward end to the vehicle for up and down swinging movements at its rear end, a pair of ground wheels arranged adjacent each said member with the wheels of each pair positioned at opposite sides of the associated member, cranked axles supported by the wheels and extending forwardly therefrom alongside the members and pivoted at forward ends to said members, differential mechanisms connecting the respective axles for translating upward movements of either to downward movements of the other, and means extending between the front and rear wheel assemblies for translating up and down movements of the front or rear wheel pairs to opposite movements of the other.

4. In a vehicle truck assembly, the combination comprising members each pivoted at one end to the vehicle and extending rearwardly from their pivoted ends in tandem relation, a pair of cranked axles pivoted at forward ends to each of the said members and extending rearwardly therealongside, ground wheels journaled on and supporting the rear ends of the axles, means supported by said members and connecting the axles for differential up and down movements, and means connecting the said members for urging either downward as the other moves upwardly.

5. In a vehicle truck assembly, the combination comprising members each pivoted at one end to the vehicle and extending rearwardly from their pivoted ends in tandem relation, a pair of cranked axles pivoted at forward ends to each of the said members and extending rearwardly therealongside, ground wheels journaled on and supporting the rear ends of the axles, means supported by said members and connecting the axles for differential up and down movements, and means connecting the said members for urging either downward as the other moves upwardly, the said axles being of equal length but being pivoted to the said members in spaced positions forwardly and rearwardly with respect to each other to offset certain of the wheels forward of the others.

6. In a vehicle suspension assembly, a pair of members each pivotally connected at its forward end to the vehicle for up and down movements at its rear end, cranked axles extending rearwardly alongside each member and pivotally connected at their forward ends to the said members, differential mechanisms connecting the said axles, wheels supporting the rear ends of the axles, and means yieldably resisting upward movements of the said members.

7. In a vehicle supporting truck for a vehicle having transversely spaced longitudinally extending frame side members, at least one member pivotally supported at its forward end to and swingable directly beneath each of said frame side members, a pair of ground wheels positioned at the rear of each of the pivoted members with one wheel of the pair inside and the other outside of the adjacent frame side member whereby to place the load between the wheels, crank axles supported by the wheels and extending forwardly therefrom and pivotally connected at forward ends to said pivoted members, differential mechanisms supported by and movable with said pivoted members and connecting the axles to translate up movement of either wheel of the wheel pairs to down movements of the other wheel of the pair, and means for yieldably resisting upward movements of the wheels.

8. In a vehicle supporting truck of the character described, front and rear bracket members on the vehicle, tandem arranged differential housing members pivotally attached to the bracket members and depending therefrom and having rearwardly extending upwardly and downwardly swingable arms, a ground wheel positioned at each side of each arm, crank axles supported by the ground wheels and extending forwardly therefrom and pivotally connected to the respective members, differentially operating means on the members connecting the forward ends of the cranks, and spring means connected between the vehicle and the rear ends of the arms for yieldably resisting upward movements of the arms.

9. In a vehicle having a frame, a pair of differential supporting members arranged in tandem and each pivoted at its forward end to the frame, a ground wheel at each side of each said member, crank axles supported at rear ends by the wheels and pivotally supported at their forward ends in the said members, differential mechanisms carried by the members and connecting the crank axles, a leaf spring connected at its ends to the said members rearwardly of their respective pivots, and said spring being pivotally connected intermediate its ends to the frame on a common center with the pivoted end of the rearmost supporting member.

10. A vehicle supporting truck of the character described, comprising a pair of differential wheel connecting mechanisms arranged in tandem relation and each swingably connected at its forward end to the vehicle for up and down swinging movements at its rear end, separate wheel pairs supporting the rear ends of said mechanisms and connected thereby for interdependent up and down differential movements, an arm extending downwardly from the rear differential mechanism and another arm extending upwardly from the front mechanism, and a connection member extending between the arms to translate up movement of either wheel pair to down movements of the other.

11. A vehicle supporting truck of the character described, comprising a pair of differential wheel connecting mechanisms arranged in tandem relation and each swingably connected at its forward end to the vehicle for up and down swinging movements at its rear end, separate wheel pairs supporting the rear ends of said mechanisms and connected thereby for interdependent up and down differential movements, arms extending from the differential mechanisms, a member connecting said arms and movable endwise by up and down movements of either wheel pair to oppositely move the other wheel pair, and means separate from said connecting member for yieldably resisting upward movements of the wheels.

12. In a vehicle, a pair of wheel assemblies each including two differentially connected wheels and a differential housing, means in the housings for differentially connecting the wheels, the forward ends of the differential housings being pivoted to the vehicle on a transverse axis, and spring means acting between the housings and upwardly spaced points on the vehicle for yieldably resisting upward swinging movements of the housings about said pivots.

13. In a vehicle, a wheel assembly at each side and each comprising a pair of differentially operating wheels and a housing extending forwardly from between the wheels, means in said housings differentially connecting the wheels, a tubular member secured transversely to the vehicle and the forward ends of the housings being pivoted about said tubular member whereby it acts as a light and rigid backbone connection and support for the wheel assemblies, and means connected between the vehicle and the housings at points to the rear of the said differential connecting means therein for yieldably resisting upward movements of the wheels.

14. In vehicle supporting mechanism of the character described, the combination comprising tandem arranged front and rear wheels at each side of the vehicle, vertically swinging means connecting the wheels to the vehicle, an element connecting said means at each side for translating upward movements of the front wheels to down movement of the rear wheels, and said connecting element at one side at least of the vehicle being adjustable in length in such manner as to selectively raise or lower both the front and rear wheels and thereby control the transverse level of the vehicle.

15. In vehicle supporting mechanism of the character described, the combination comprising tandem arranged front and rear wheels at each side of the vehicle, vertically swinging means connecting the wheels to the vehicle, an element connecting said means at each side for translating upward movements of the front wheels to down movement of the rear wheels, said connecting element at one side at least of the vehicle being adjustable in length in such manner as to selectively raise or lower both the front and rear wheels and thereby control the transverse level of the vehicle, and remotely controllable power actuated means for so adjusting the connecting element.

16. In a vehicle truck assembly, the combination comprising members each pivoted at one end to the vehicle and extending rearwardly from their pivoted ends in tandem relation, a pair of cranked axles pivoted at forward ends to each of the said members and extending rearwardly therealongside, ground wheels journaled on and supporting the rear ends of the axles, means supported by said members and connecting the axles for differential up and down movements, and the said axles being operatively arranged to offset certain of the wheels forward of the others.

17. In a vehicle truck assembly, the combination comprising members each pivoted at one end to the vehicle and extending rearwardly from their pivoted ends, a pair of cranked axles pivoted at forward ends to each of the said members and extending rearwardly therealongside, ground wheels journaled on and supporting the rear ends of the axles, means supported by said members and connecting the axles for differential up and down movements, and means connecting the said members for urging either downward as the other moves upwardly, the said axles being of such length and so pivoted to the said member as to offset certain of the wheels forward of the others.

18. In a vehicle supporting truck of the character described, at least one bracket member on the vehicle, a differential housing member pivotally attached to the bracket member and depending therefrom and having a rearwardly extending upwardly and downwardly swingable arm, a ground wheel positioned at each side of each arm, crank axles supported by the ground wheels and extending forwardly therefrom and pivotally connected to the housing member, differentially operating means in the housing member connecting the forward ends of the cranks, and spring means connected between the vehicle and the rear end of the arm for yieldably resisting upward movements of the arm.

19. In a vehicle supporting truck of the character described, front and rear bracket members mounted on the vehicle, tandem arranged differential housing members pivotally attached to the bracket members and having rearwardly extending upwardly and downwardly swingable arms, a ground wheel positioned at each side of each arm, crank axles supported by the ground wheels and extending forwardly therefrom and pivotally connected to the respective housing members, differentially operating means in the housing members connecting the forward ends of the cranks, and spring means connected between the vehicle and the rear ends of the arms for yieldably resisting upward movements of the arms.

20. In a vehicle supporting truck of the character described, front and rear bracket members mounted on the vehicle, tandem arranged differential housing members pivotally attached to the bracket members and having rearwardly extending upwardly and downwardly swingable arms, a ground wheel positioned at each side of each arm, crank axles supported by the ground wheels and extending forwardly therefrom and pivotally connected to the respective housing members, differentially operating means in the housing members connecting the forward ends of the cranks, and a leaf spring connected at its center to the vehicle and at its respective ends to the rear ends of the arms for yieldably resisting upward movements of the arms.

21. A vehicle supporting truck of the character described, comprising a pair of differential wheel connecting mechanisms arranged in tandem relation and each pivotally connected at its forward end to the vehicle for up and down swinging movements at its rear end, separate wheel pairs supporting the rear ends of said mechanisms and connected thereby for interdependent up and down differential movements, an arm extending upwardly from the front mechanism, and a connection member extending between the arm and a point on the rear differential mechanism below its pivot to translate up movement of either wheel pair to down movements of the other.

22. A vehicle supporting truck of the character described, comprising front and rear pivot supports, a pair of differential wheel connecting mechanisms arranged in tandem relation and pivotally connected at their forward ends to the supports for up and down swinging movements at their rear ends, separate wheel pairs supporting the rear ends of said mechanisms and connected thereby for interdependent up and down differential movements, and a link member connected between the differential mechanisms to translate up movement of either wheel pair to down movements of the other, the said link member being connected at its forward end above the front support and at its rear end below the rear support.

23. A vehicle supporting truck of the character described, comprising a pair of differential wheel connecting mechanisms arranged in tandem relation and each swingably connected at its forward end to the vehicle for up and down swinging movements at its rear end, separate wheel pairs supporting the rear ends of said mechanisms and connected thereby for interdependent up and down differential movements, an arm extending from one of the differential mechanisms, a member connecting said arm to the other differential mechanism and movable endwise by up and down movements of either wheel pair to oppositely move the other wheel pair, and means separate from said connecting member for yieldably resisting upward movements of the wheels.

24. A vehicle supporting truck of the character described, comprising a pair of differential wheel connecting mechanisms arranged in tandem relation and each swingably connected at its forward end to the vehicle for up and down swinging movements at its rear end, separate wheel pairs supporting the rear ends of said mechanisms and connected thereby for interdependent up and down differential movements, arms extending from the differential mechanisms, a member connecting said arms and movable endwise by up and down movements of either wheel pair to oppositely move the other wheel pair, means forming part of said connecting member for yieldably resisting upward movements of the wheels, and means also forming part of the said connecting member for adjusting its length to thereby adjust the wheels simultaneously.

25. In a vehicle supporting mechanism, the combination comprising a transverse pivot attached to the vehicle, a member having wide spread bearings at its forward end pivoted on said pivot member whereby the rear end of the member may swing upwardly and downwardly with respect to the vehicle, a cranked axle journaled at its forward end in each side of the member and extending rearwardly therealongside, ground wheels journaled on and supporting the rear ends of the axles, means on the member differentially connecting the axles, and spring means operatively arranged to yieldably resist upward movements of the rear end of the member.

26. In a vehicle supporting mechanism, the combination comprising a transverse pivot member attached to the vehicle, a housing having wide spread bearings at its forward end pivoted on said pivot member whereby the rear end of the housing may swing upwardly and downwardly with respect to the vehicle, a cranked axle journaled at its forward end in each side of the housing and extending rearwardly therealongside, ground wheels journaled on and supporting the rear ends of the axles, means contained in the housing differentially connecting the axles, spring means operatively arranged to yieldably resist upward movements of the rear end of the housing, and the said wheels being mounted by the axles with one wheel offset forwardly of the other.

27. In a vehicle supporting mechanism of the character described, front and rear mounting brackets on the vehicle, front and rear tubes mounted in the brackets and extending crosswise of the vehicle, a differential housing pivotally mounted at its forward end adjacent the ends of both front and rear tubes and extending rearwardly therefrom, wheel supported cranked axles journaled to each side of the housings, means in each housing differentially connecting the axles to translate up movements of either to down movements of the other, and a leaf spring at each side of the vehicle connected at its center to the rear tube and connected at its front and rear ends to the front and rear housings at that side to yieldably resist upward movements of the housings.

28. In vehicle supporting mechanism of the character described, the combination comprising tandem arranged front and rear wheels at each side of the vehicle, vertically swinging means connecting the wheels to the vehicle, an element connecting said means at each side for translating upward movements of the front wheels to down movements of the rear wheels, said connecting element at one side at least of the vehicle being adjustable in length in such manner as to selectively raise or lower both the front and rear wheels and thereby control the transverse level of the vehicle, and fluid actuated means associated with said connecting element for varying its effective length.

29. In a vehicle truck assembly, the combination comprising members each pivoted at one end to the vehicle and extending rearwardly from their pivoted ends, a pair of cranked axles pivoted at forward ends to each of the said members and extending rearwardly therealongside, ground wheels journaled on and supporting the rear ends of the axles, means supported by said members and connecting the axles for differential up and down movements, and the said axles being operatively arranged to offset certain of the wheels forward of the others.

30. In a vehicle suspension assembly of the character described, a member at each side of the vehicle and each pivotally connected at its forward end to the vehicle for up and down swinging movements at its rear end, cranked axles extending rearwardly alongside each member and pivotally connected at their forward ends to the member for up and down swinging movements at their rear ends, differential mechanisms connecting the axles whereby as either swings downward the other swings upward an equal amount, wheels supporting the rear ends of the axles, and all of the members and the axles angling rearward and downward from said pivotal connections to the frame whereby the wheels will travel over an obstruction in the road with a minimum transmission of vertical acceleration and deflection to the vehicle.

31. A vehicle suspension assembly including a member pivoted at its forward end to the vehicle for up and down movements at its rear end, cranked axles extending rearwardly along the opposite sides of the member and pivotally connected at their forward ends to said member for up and down movements at their rear ends, wheels supporting the rear ends of the axles, the said axles being of the same length but forwardly and rearwardly offset to similarly offset the wheels, and differential means connecting the axles.

32. A vehicle suspension assembly including a member pivoted at its forward end to the vehicle for up and down movements at its rear end, cranked axles extending rearwardly along the opposite sides of the member and pivotally connected at their forward ends to said member for up and down movements at their rear ends, wheels supporting the rear ends of the axles, the said axles being of the same length but forwardly and rearwardly offset to similarly offset the wheels, differential mechanism connecting the axles, and means for resisting upward movement of the member.

33. A vehicle wheel compensating suspension comprising a plurality of wheel assemblies each having a member pivoted to the vehicle for swinging movements with respect thereto in an upright plane, a ground wheel at each side of the member, forwardly and rearwardly extending crank axles pivoted at forward ends to said member and supported at rear ends by the wheels, means connecting the axles for differential up and down movements at their wheel supported ends, and spring means acting between the vehicle and said member for resisting upward movement of the wheel assembly with reference to the vehicle.

34. In a vehicle supporting truck, the combination comprising a pair of members arranged in tandem relationship and each pivotally connected at its forward end to the vehicle for up and down swinging movements at its rear end, a pair of ground wheels arranged adjacent each said member with the wheels of each pair positioned at opposite sides of the associated member, cranked axles supported by the wheels and extending forwardly therefrom alongside the members and pivoted at forward ends to said members, differential mechanisms connecting the respective axles for translating upward movements of either to downward movements of the other, and spring means connected between the vehicle and said members rearwardly of the pivot connections of the latter to yieldably resist upward movements of the members.

35. A vehicle wheel compensating suspension comprising a plurality of wheel assemblies each having a bracket for attachment to the vehicle and said bracket having depending transversely spaced apertured lugs, a pivot member carried in said lugs, a forwardly and rearwardly extending housing member having a forked forward end and wide spread bearings positioned at opposite sides of the bracket lugs and pivotally attached thereto by the pivot member whereby the housing member will swing upwardly and downwardly at its rear end with respect to the vehicle, a forwardly and rearwardly extending crank axle arranged at each side of said housing member and means pivoting the forward ends of the axles to the housing member for up and down movements at their rear ends, ground wheels supporting the rear ends of the axles, differential mechanisms connecting the axles to translate upward movement of either to downward movement of the other, and spring means acting between the vehicle and rear end portions of the housing member to yieldably resist upward movement of the latter.

36. A vehicle wheel compensating suspension comprising a plurality of wheel assemblies each having a bracket for attachment to the vehicle and said bracket having depending transversely spaced apertured lugs, a pivot member carried in said lugs, a forwardly and rearwardly extending housing member having a forked forward end and wide spread bearings positioned at opposite sides of the bracket lugs and pivotally attached thereto by the pivot member whereby the housing member will swing upwardly and downwardly at its rear end with respect to the vehicle, a forwardly and rearwardly extending crank axle arranged at each side of said housing member and means pivoting the forward ends of the axles to the housing member for up and down movements at their rear ends, ground wheels supporting the rear ends of the axles, differential mechanisms connecting the axles to translate upward movement of either to downward movement of the other, spring means acting between the vehicle and rear end portions of the housing member to yieldably resist upward movement of the latter, there being two of such assemblies in tandem at each side of the vehicle and said spring means comprising a forwardly and rearwardly extending leaf spring connected at its opposite ends to the housing member, and a member secured to the center of the leaf spring and having a bearing journaled on the pivot member between the lugs of the rear bracket to produce a walking beam action between the front and rear wheel assemblies.

ADOLPH RONNING.

REFERENCES CITED

The following references are of record in the file of this patent:

UNITED STATES PATENTS

| Number | Name | Date |
|---|---|---|
| 1,514,662 | Hukill | Nov. 11, 1924 |
| 1,833,053 | McManus | Nov. 24, 1931 |
| 1,857,249 | Marcum | May 10, 1932 |
| 1,861,866 | Knox et al. | June 7, 1932 |
| 1,902,712 | Leipert | Mar. 21, 1933 |
| 1,930,208 | Marcum | Oct. 10, 1933 |
| 1,940,914 | Marcum | Dec. 26, 1933 |
| 1,981,593 | Fageol | Nov. 20, 1934 |
| 2,082,292 | Kendall | June 1, 1937 |
| 2,121,862 | Dodge | June 28, 1938 |
| 2,172,173 | Peterman | Sept. 5, 1939 |
| 2,194,199 | Ash | Mar. 19, 1940 |
| 2,194,323 | Peterman | Mar. 19, 1940 |
| 2,208,601 | Ronning | July 23, 1940 |
| 2,209,528 | Larison | July 30, 1940 |
| 2,217,817 | Ronning | Oct. 15, 1940 |
| 2,226,100 | Larison | Dec. 24, 1940 |
| 2,236,695 | Peterman | Apr. 1, 1941 |
| 2,236,734 | Ronning | Apr. 1, 1941 |
| 2,239,849 | Judd | Apr. 29, 1941 |
| 2,270,022 | Price | Jan. 13, 1942 |
| 2,303,501 | Ronk | Dec. 1, 1942 |
| 2,347,409 | Harbers | Apr. 25, 1944 |
| 2,349,289 | Larison | May 23, 1944 |
| 2,386,988 | Sullivan | Oct. 16, 1945 |
| 2,395,640 | Pearson | Feb. 26, 1946 |
| 2,411,885 | Larison | Dec. 3, 1946 |

FOREIGN PATENTS

| Number | Country | Date |
|---|---|---|
| 467,309 | Germany | Oct. 23, 1928 |
| 571,499 | France | May 17, 1924 |
| 654,482 | Germany | Dec. 20, 1927 |